Feb. 3, 1925.
F. K. VREELAND
1,525,110
AUDIO FREQUENCY SELECTIVE SIGNALING SYSTEM
Filed Aug. 6, 1919   2 Sheets-Sheet 1
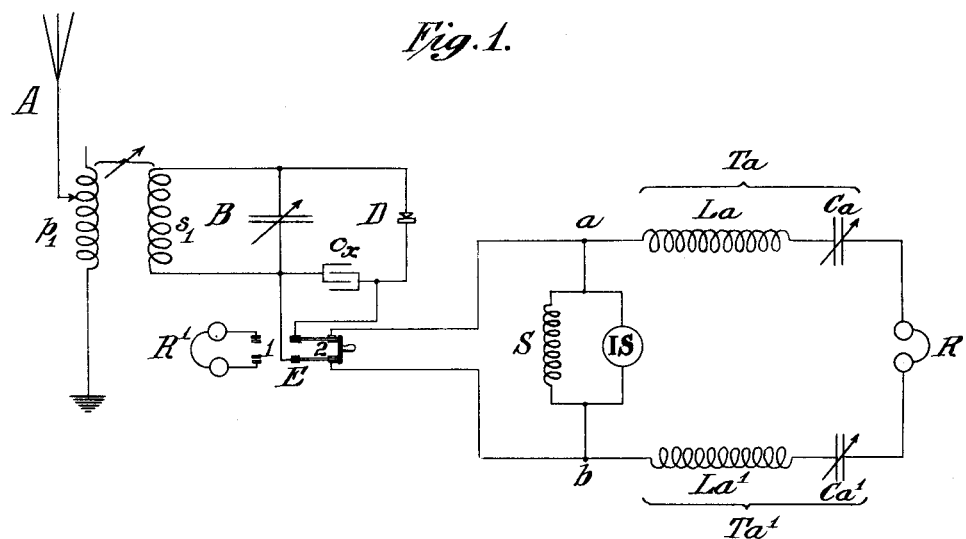
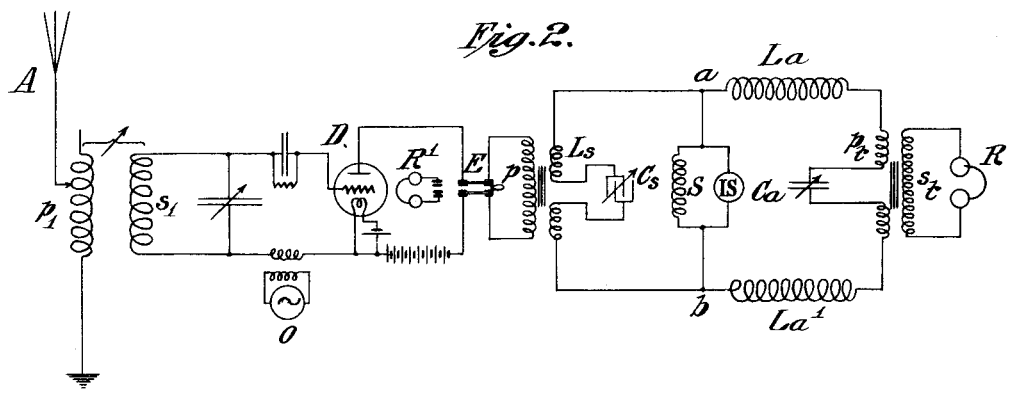
INVENTOR
Frederick K. Vreeland
BY
Frank L. Dyer
ATTORNEY Feb. 3, 1925.
F. K. VREELAND
1,525,110
AUDIO FREQUENCY SELECTIVE SIGNALING SYSTEM
Filed Aug. 6, 1919      2 Sheets-Sheet 2
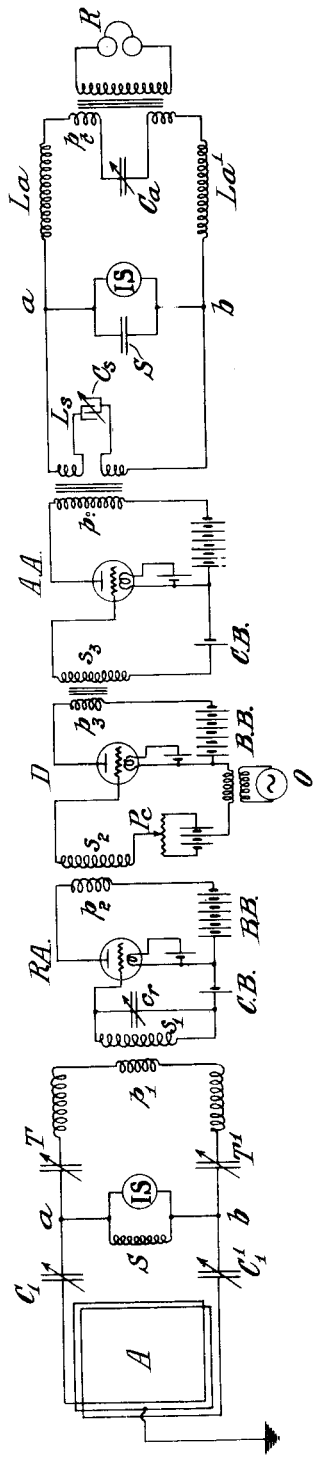
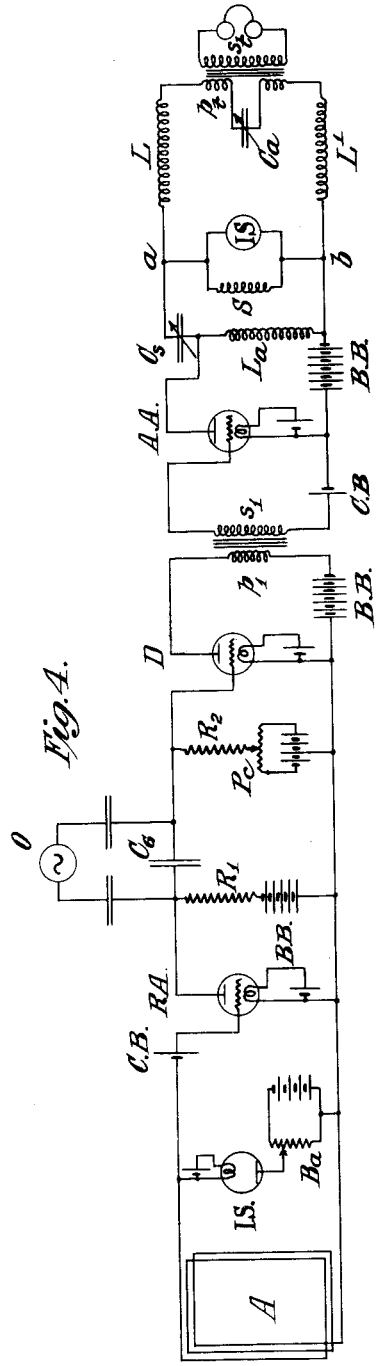
INVENTOR
Frederick K. Vreeland
BY
Frank L. Dyer
ATTORNEY Patented Feb. 3, 1925.

1,525,110

UNITED STATES PATENT OFFICE.

FREDERICK K. VREELAND, OF MONTCLAIR, NEW JERSEY.

AUDIO FREQUENCY-SELECTIVE SIGNALING SYSTEM.

Application filed August 6, 1919. Serial No. 315,650.

*To all whom it may concern:*

Be it known that I, FREDERICK K. VREELAND, a citizen of the United States, residing at Montclair, county of Essex, State of New Jersey, have invented certain Improvements in Audio Frequency-Selective Signaling Systems, of which the following is a specification.

The invention herein described relates to an improvement in receiving systems for radio telegraphy whereby the efficiency and clarity of the reception is improved and the disturbing effects of strays, atmospheric or artificial, is eliminated or minimized.

In my United States Patent No. 1,315,584 I have described a receiving system comprising a baffle circuit adapted to permit the ready reception of signal impulses of a definite frequency while opposing the passage of strays, combined with a by-pass circuit adapted to divert such strays from the receiver.

In my United States Patent No. 1,407,103, I have described an improved system including an intensity selective device adapted to discriminate between signal impulses and strays, preventing the detrimental action of strays on the receiver while not materially interfering with the reception of signal impulses.

In my application filed on even date herewith, Serial No. 315,651, I have described a system including a simplified form of apparatus which is peculiarly adapted to the elimination of strays of sudden impulsive character, and including the feature of converting the stray energy into oscillations of non-signal frequency and dissipating their energy in innocuous form.

The present invention utilizes the more general features and principles of all the foregoing applications together with novel features whereby the efficiency of the apparatus is increased and its construction greatly simplified.

Among the difficulties encountered in former efforts to eliminate interferences by atmospheric strays is the diversity of the atmospheric phenomena that are generally included in this term. Apparatus that may operate successfully on strays of one type will not be adapted to eliminating strays of a different type.

This difficulty is overcome in the present invention by operating chiefly and directly on the currents of relatively low and usually audible frequency into which the signal impulses are converted by the detector.

Whatever the origin or original character of the atmospheric strays, and whatever the type of the signal impulses to be received, whether spark oscillations or undamped waves, after passing through the detector and associated apparatus the signal impulses are distinguished from the strays by the fact that they are reduced to currents of definite and usually audible frequency and moderate intensity, whereas the atmospheric strays are reduced to erratic currents which are aperiodic or of no definite audio frequency. Usually, also the stray impulses are very abrupt and transitory, whereas the signal impulses are more or less sustained. Furthermore, the strays, in so far as they constitute serious interference with the signals, have an intensity or amplitude that is usually greater than that of the signal impulses. In carrying out the present invention I utilize all these distinctions for separating the signal currents of a definite low and preferably audible frequency from the erratic currents produced by strays, and I exclude at the same time currents of other frequencies that may be produced by foreign signals, so that the signal currents can be clearly and effectively observed while the stray currents are excluded from the receiver and their energy is dissipated.

To this end I cause a baffle circuit and an intensity selective by-pass or other energy dissipating means to operate directly on the currents of audio frequency in a manner similar to that employed in operating on the radio frequency currents, as set forth in my former applications, with the addition of certain features particularly adapted to audio frequency operation. The audio frequency employed may be inherent in the transmitted signals themselves, as in the case of spark signals having a definite group frequency, or it may be produced arbitrarily at the receiving station, as in the case of audio frequency beats resulting from the interference of a sustained signal wave with a locally generated oscillation of different frequency, or it may result from interruptions or variations in the received signal produced by a "tikker" or tone wheel or similar device.

Another feature of the invention consists in the employment of means for preventing strays from producing shock oscillations of audio frequency which might be confused with signal impulses.

In the drawing Figure 1 illustrates an embodiment of the invention in simple form, adapted to use with any one of a large number of well known detectors.

Figure 2 shows a somewhat modified arrangement, which is shown specifically as applied to a thermionic detector or electron relay in the non-oscillating state, and adapted for the reception of spark signals or of continuous waves.

Figure 3 shows an arrangement which combines operation on the radio frequency with operation on the audio frequency.

Figure 4 shows an aperiodic radio frequency system embodying the invention. It also shows a simple form of preliminary selector applied on the radio frequency side of the detector.

To effect the audio frequency discrimination I employ a baffle circuit similar to that described in my former application, but tuned to the audio frequency of the signals, and having such large self induction and capacity reactances that its decrement is reasonably small, notwithstanding the high impedance of the associated apparatus. It has also preferably a large energy-storing capacity compared to that of the rest of the system, as fully explained in my application of even date herewith. Such a circuit will permit the passage of signal impulses from the detector to the telephone or other translating device without material diminution, but will oppose the passage of the aperiodic or erratic strays. Associated with the baffle circuit I employ preferably an intensity selector adapted to discriminate between strong impulses, as applied to its terminals, and weaker ones, or specifically to permit the passage of impulses exceding a given intensity while obstructing the flow of weaker impulses. This intensity selector is preferably arranged as a by-pass or shunt to the baffle circuit, at points where the potential difference produced by signals is small while that produced by strays is relatively large.

By this combination of baffle circuit and intensity selector, their respective powers of discrimination between signal impulses and strays augment each other. Since the intensity selector is connected to the baffle circuit at points of minimum potential difference for the periodic signals but large potential difference for erratic strays, the intensity selective power of the by-pass is increased by the fact that the full intensity of the strays is effective while the effective intensity of the signals is reduced to a minimum. By this means the intensity selector or other energy dissipating means acts preferentially in diverting strays and so is adapted to divert from the receiver not only powerful strays, but also strays of relatively feeble intensity, while not materially diverting signal impulses that are intrinsically much stronger.

Together with the intensity selector I employ preferably a reactive by-pass connected across the terminals of the baffle circuit in the manner fully set forth in my last named application. This reactive by-pass has a reactance, which may be due either to a capacity or an inductance, that is small compared to the reactances of the baffle circuit but relatively large compared to the reactances of the associated apparatus, the arrangement and relative proportions of the several parts being such that any impulses that may tend to produce shock oscillations in the audio frequency eliminating system will expend themselves preferably in a circuit including the reactive by-pass, whose oscillation frequency is different from the signal audio frequency, and they will therefore be excluded by the baffle circuit, producing at the same time a potential difference across the intensity selector which causes it to operate strongly in absorbing such shock energy and to guard the baffle circuit against excessive potential differences; all of which functions are fully explained in my former application, their application to the present case being similar to their application on radio frequency, though, of course, the electrical magnitude of the several elements is duly adapted to the lower frequencies employed, as will be well understood by one skilled in the art.

By suitably applying these principles I have found it possible, using only a single intensity selector and a simple baffle circuit, to eliminate entirely or reduce to an insignificant value strays of such tremendous magnitude that in an ordinary receiver they render the signals entirely inaudible, while the signal impulses come through with practically undiminished intensity. In the case of very intense crackling strays however it is sometimes desirable to take the peak off of the stray by an initial selector of relatively low sensitivity, thus making it possible to employ a more sensitive adjustment of the final selector. The initial selector operates preferably on the radio frequency.

An important feature of the present invention is the simplicity of the apparatus, which can be applied as an adjunct to almost any good ordinary receiving system without altering its construction or deranging its adjustment. Usually the stray eliminating apparatus is merely connected in the place of the telephone receiver ordinarily employed for receiving the signals, and the circuits are tuned to the audio frequency of the signals, in the case of damped waves or other signals that have an intrinsic audio frequency, or adjusted to respond to the beat frequency produced by undamped waves, or otherwise adapted to respond to the audio frequency of the signals.

Another advantage of the present invention resides in the ease with which it may be combined with amplifiers for the clear reception of the feeblest signals. It is well known that modern receiving and amplifying devices are so marvelously sensitive that practically the only limit to the scope of long distance signaling is the clarity of the signals. If strays and other interference be eliminated the feeblest signals can be amplified indefinitely.

The apparatus of the present invention, operating on the audio frequency currents, may be applied to these currents after they have passed through the amplifier, and brought to any desired intensity. Thus it is not necessary to adapt the intensity selectors to the strength of the particular signal to be received, but any signal, however weak or strong, may be brought to the requisite intensity for the most effective operation of the selectors, which thus operate with the highest efficiency in separating the strays from the signals. The same stray eliminating apparatus, therefore, is not only applicable to receivers of a great variety of types, but is equally effective on signals of all strengths, from the most powerful to the feeblest. I prefer therefore to design the stray eliminating apparatus to operate most effectively on signals of normal loudness, and to bring the received impulses to the most effective intensity by amplifiers. Such an arrangement is shown in Figs. 3 and 4.

It will be readily understood that, while amplifiers are omitted from the other figures, they may be included in any of the forms of apparatus described, in the well known manner.

The specific improvement of the present invention, operating on the low or audio frequency, may be combined with any of the forms of apparatus specifically set forth in my former applications herein referred to, as applied to the radio frequency currents, thus utilizing a second order of selectivity, though this is usually not required. One form of such combined apparatus is shown in Fig. 3.

In some cases it is desirable to apply a single rough selector on the radio frequency side of the detector, as shown in Figure 4. The detector here illustrated is a thermionic relay, and with such a detector an asymmetrical selector is usually effective with the negative terminal connected to the grid. Inasmuch as powerful strays tend to cause a negative charge to accumulate on the grid, if the grid potential is low, the selector thus arranged prevents this negative charge from exceeding the electromotive force to which the selector is designed to respond. In extreme cases two or more selectors may be used in series in order to set this limiting electromotive force at a higher value.

Fig. 1 represents diagramatically a simple form of apparatus embodying the invention, as applied to the reception of spark or other discontinuous signals. A is the antenna or collecting circuit. B is the usual tuned receiving circuit and D is a detector of any one of the many well known types which converts the high frequency signal currents into currents of a low or audio frequency. R' is a telephone receiver which may be employed in the ordinary way to observe these currents when the switch E is thrown to the position 1. When the switch E is thrown to the position 2 the converted signal currents are applied to the stray eliminating apparatus, which includes a baffle circuit $L_a$ $C_a$ R $C_a'$ $L_a'$, comprising the inductance elements $L_a$ $L_a'$ and the capacity elements $C_a$ $C_a'$ together with the telephone receiver or other translating device R. Shunted across the points $a$, $b$ of this baffle circuit is a by-pass comprising an intensity selector I.S. and a reactive by-pass, which serves to give to any shock oscillations an innocuous frequency, as explained in my application of even date herewith.

The baffle circuit is tuned to the audio frequency by means of the inductances $I_a$ $I_a'$ and the capacities $C_a$ $C_a'$. Preferably this circuit is made symmetrical, the inductance $L_a$ and the capacity $C_a$ being so proportioned as to neutralize each other at the signal audio frequency and together comprising a tuned baffle element $T_a$, and the inductance $L_a'$ and the capacity $C_a'$ constituting a similar baffle element $T_a'$. In order that the tuning may be effective, the capacity and inductance reactances of these baffle elements should be large with respect to the resistance of the receiver R and also with respect to the detector D and its associated apparatus. Inasmuch as the capacity reactance and the inductance reactance are balanced at the signal frequency, the points $a$ and $b$ are points of small potential difference at this frequency, and any apparatus shunted across these points will not materially reduce the signal strength provided its impedance is large compared with the effective resistance of the baffle circuit. Impulses of any other frequency, or erratic strays, will, however, encounter the large unbalanced reactance of the baffle circuit and so will traverse this circuit with difficulty. The points $a$ and $b$ will be points of large potential difference for such impulses, which will thus act powerfully upon the by-pass or intensity selector located at this point, and will be diverted from the receiver.

The intensity selector is indicated in this and in the other figures, for the sake of simplicity, as a circle marked I.S., it being understood that any one of the forms of intensity selector described in my applications hereinbefore referred to may be employed, as well as any other equivalent device for the purpose. The reactive by-pass S is shown as an inductance, though it will be understood that a capacity reactance may be substituted, as fully explained in my former applications, or a combination of the two may be used. Certain beneficial results may be obtained by the use of a non-reactive by-pass, but I prefer to use the reactive by-pass for the reasons fully explained in my former application.

O is a local oscillator or other source of high frequency currents of slightly different frequency from the signal impulses, which is employed for producing beats when continuous waves are being received. When spark oscillations are received the oscillator O is not required.

When working on continuous waves it is desirable slightly to detune the collecting circuit A, $p_1$, so that the shock oscillations produced by strays will have a frequency slightly different from the signal radio frequency, and hence the beats which they produce on the audio frequency side will differ in much greater proportion from the signal beat frequency, so that they may be readily separated from the signal beat impulses. The resonant circuit B may also be detuned, but this is usually unnecessary. A degree of detuning, too slight to affect materially the strength of the signal impulses, is amply sufficient to produce the requisite difference of audio frequency.

A coupling condenser $C_x$ is sometimes desirable. When used, its capacity should be sufficiently large not to disturb materially the tuning of the baffle circuit. The reactance of S should be so chosen with respect to $C_x$ and the other constants of the detector system that any shock oscillations that may be produced in them will have a frequency different from the signal audio frequency as explained in my concurrent application, and so will be excluded from the detector by the baffle circuit and intensity selector.

To secure the greatest effectiveness of the apparatus in this simple form the impedance of the detector D and its associated apparatus should be sufficiently low to permit the baffle circuit $T_a$ $T_a'$ to oscillate strongly without producing a large potential difference between points $a$ and $b$. Some of the most efficient detectors in general use have a very high impedance or possess an electrostatic capacity which impairs the effectiveness of the apparatus. In such cases I prefer to use the arrangement shown in Fig. 2. Here the baffle circuit is connected to the detector through a tuned element $L_s$ $C_s$, which is coupled to the detector through a transformer $p$, $L_s$, or by any other suitable coupling means. This electromotive element is preferably independently tuned to the signal audio frequency by balancing the inductance reactance of $L_s$ against the capacity reactance of $C_s$. The points $a$ and $b$ thus become points of minimum potential difference, even when the detector is one of high impedance, such as a thermionic relay, which is the form of detector shown in the figure. In such case the primary $p$ should have a large reactance, comparable to the impedance of the detector, and the secondary $L_s$ preferably a smaller reactance, which is small compared to the reactances of $L_a$ and $C_a$. This smaller reactance is desirable, inasmuch as it avoids the necessity of excessively large reactances in the baffle circuit.

The telephone receiver R is here shown connected in the secondary circuit $s_t$ of a transformer whose primary $p_t$ is in two parts between which the condenser $C_a$ is connected, thus forming a symmetrical arrangement with a single adjustment element $C_a$. The condenser $C_s$ is similarly arranged between two sections of the coil $L_s$.

The by-pass S is connected across the points $a$, $b$.

I have found that a simple shunt, comprising inductance or capacity or simple resistance, of an impedance which is low compared to the reactances of the baffle circuit but higher than its equivalent resistance at the signal frequency, will materially divert strays from the receiver, though I prefer to use, either with or without a non-selective by-pass element, an intensity selective device of the general character set forth in my Patent No. 1,407,103, and my application concurrent herewith, where a variety of types of selector are described.

The magnitude of the reactance S is a matter of some importance, for the reasons set forth in my concurrent application, in describing the radio frequency apparatus.

It should have sufficient impedance with reference to the equivalent resistance of the baffle circuit to prevent material shunting of signal impulses from the receiver, but it should preferably be not too large with respect to the inductance $L_s$. It thus forms, in conjunction with the coil $L_s$ and condenser $C_s$ a closed circuit whose natural frequency is different from that of the signal impulses, and which is much less stiff than the baffle circuit $L_a$, $p_t$, $C_a$, $L_a'$; hence any shock oscillations that may be set up therein will have a frequency different from the signal frequency, and so will be excluded from the baffle circuit and their energy absorbed and dissipated by the intensity selector. Such shock oscillations traversing the by-pass S set up a considerable potential difference across the intensity selector, while oscillations of signal frequency, which do not materially flow through S, do not produce such a potential difference, and hence are not absorbed. In certain cases it may be desirable to partially detune the circuit including S by varying the capacity $C_s$, for a similar reason. As the reactances of $L_s$ and $C_s$ are much smaller than those of $L_a$ and $C_a$, this may be done without materially affecting the tune of the baffle circuit.

When the receiving apparatus employs a simple rectifying detector, as distinguished from a beats receiver, atmospheric strays, whether aperiodic or oscillatory, are ordinarily reduced to simple aperiodic impulses, having no definite frequency of their own and hence readily distinguished from the periodic signal impulses. The audio frequency eliminator is thus relatively free from the difficulty encountered in radio frequency elimination arising from the fact that the antenna or other collecting device may become the seat of shock oscillations of signal frequency which are more difficult to eliminate than aperiodic impulses, any shock oscillations of radio frequency that may be produced being converted into simple aperiodic impulses on passing through the detector.

In the case of receivers operating on the beats principle, however, radio frequency shock oscillations will produce beats with the local currents, which may be confused with the signal beats, since they have, in the arrangement ordinarily employed, the same frequency as the signal beats. Such strays, even though strongly damped, have a musical ring which is confusing to the operator and difficult to separate electrically from the signal beat note.

The present invention overcomes this difficulty by converting the energy of strays into shock oscillations of a frequency different from the signal radio frequency, which are either removed by a radio frequency eliminator as described in my concurrent application or allowed to pass through the detector, producing beats of a frequency different from the signal beat frequency which are readily distinguished from the signals by the audio frequency eliminator. The latter method possesses a distinct advantage arising from the fact that a very small difference in radio frequency produces a relatively large difference in audio frequency. For example, if the signals have a radio frequency of 100,000 cycles per second, and are caused to produce beats of an audio frequency of 1,000 cycles per second, then shock oscillations whose frequency differs only 1% from the signal frequency will produce beats differing by 100% from the signal beat frequency. They are thus far more readily separated from the signals on the audio frequency side than on the radio frequency side. As a particular case under this principle, the shock oscillations may have the same radio frequency as the local beat-producing oscillations so that the strays will produce no beats of audio frequency whatsoever, but simple aperiodic impulses.

There are a variety of effective ways of accomplishing this result. One of the simplest consists in slightly detuning the radio frequency receiving system. In a form of beats receiver quite widely employed the signal oscillations are received by a collector tuned to the signal frequency, which is coupled to a receiver circuit in which local oscillations are set up by the self-oscillation of a thermionic detector. The frequency of these local oscillations is determined by the natural period of the receiver circuit. In order that these local oscillations shall produce beats of convenient frequency with the signal oscillations this local circuit is ordinarily slightly detuned. Since the collector circuit is tuned to the signal frequency, impulsive strays will set up in it shock oscillations of signal frequency which produce confusing beats in the receiver circuit.

In carrying out the present invention, slightly detuning the collector circuit causes a small difference in the radio frequency of the shock oscillations and a relatively large difference of frequency of the shock beats, as above explained.

I prefer to use instead of a self-oscillating detector, a separate oscillator coupled to the receiver circuit. The receiver circuit may then be accurately tuned to the signal frequency, and hence any slight weakening of the signals which might be produced by the detuning of the collector circuit is more than offset by the accurate tuning of the receiver circuit.

Such an arrangement is shown in Fig. 3. This arrangement is highly effective in that it permits adjustments of the beat frequency entirely independent of the tuning of the system. It is thus easy to control the frequency of the signal beats at will and to control independently the frequency of the shock beats, giving them a frequency higher or lower than the signal beat frequency, as may be desired, or reducing them to a zero frequency. The operator is thus enabled, by an adjustment of the radio frequency circuits which does not materially affect the signal strength, to produce a highly effective discrimination between signals and strays.

Another and still more effective arrangement consists in the employment of a radio frequency baffle circuit with a reactive bypass, either with or without an intensity selector, on the radio frequency side, as fully explained in my concurrent application and shown in Fig. 4 herein. The reactive bypass causes the stray to produce shock oscillations of non-signal frequency without detuning of the signal receiving circuit. A by-pass of very small capacity reactance or inductance reactance will cause a sufficient change in the shock oscillation frequency, when multiplied by the beats receiver, to be very easily distinguished from signal beats by the audio frequency eliminator.

The reactive by-pass may be used with an intensity selector, as described in my former application and illustrated in Fig. 4, or the intensity selector may be omitted on the radio frequency side and employed only on the audio frequency side.

A third method of avoiding confusion from shock oscillations consists in the use of an aperiodic receiving system. In ordinary practice it is usual to tune the receiving system for the double purpose of increasing the intensity of the signals and securing selectivity. The audio frequency eliminator here set forth is so highly selective that radio frequency selectivity is not required; hence an aperiodic radio frequency system is effective. The diminished intensity of the signals is not detrimental inasmuch as any desired signal strength may be secured by amplifiers. I have found it quite practicable, therefore, to employ an aperiodic collector, such as the simple loop collector illustrated in Fig. 4, care being taken to avoid such self-capacity and detector capacity effects as will cause the loop to oscillate. This loop is connected directly to a radio frequency amplifier, or to a detector feeding into audio frequency amplifiers or to a combined system of radio and audio frequency amplification, as shown in Fig. 4, all the amplifier circuits being made aperiodic so that shock oscillations are not produced. The amplified audio frequency currents, whether amplified on the radio frequency side or amplified after rectification, are applied to the audio frequency eliminator, which readily discriminates between the sustained signal currents and the aperiodic strays.

The local beat producing oscillation may be combined with the signal oscillations at the collector, and the complex beat current amplified by radio frequency amplifiers, or the currents may be combined at the collector, rectified by a detector and the beat current amplified, or the signal currents alone may be amplified by radio frequency amplifiers, and the local currents combined with them to produce beats after amplification. In any case, the results are similar. The last mentioned case is illustrated in Figs. 3 and 4.

It is desirable to use a separate generator for the beat producing oscillations as shown in Figs. 3 and 4 instead of a self-oscillating detector, to avoid the use of circuits in which shock oscillations may be set up.

The arrangement of Figure 2 possesses distinct advantages over the simple arrangement of Fig. 1. The intensity selector proper may be designed without particular reference to the electrical constants of the detector, the ratio of transformation of the transformer $p$, $L_s$, being so chosen as to secure the best results with the particular detector employed. In practice I have found that if the primary inductance is made sufficiently large the same apparatus may be used effectively with a large variety of detectors, being simply substituted for the telephone receiver $R'$ ordinarily employed by the throwing of the double throw switch E. The primary coil $p$ may however be made with taps to adapt it to detectors of different characteristics, when required. The use of the telephone transformer $p_t$, $s_t$ also is usually preferable to the direct inclusion of the telephone in the baffle circuit, since it makes the design of the baffle system independent of the particular receiver used.

In Fig. 3 I have shown an arrangement in which the principles of my stray eliminating system are applied to both the radio frequency and the audio frequency. It is also of very general application, being adapted to the reception of continuous undamped waves or of discontinuous damped spark signals, and is also adapted to long or short wave lengths. In the particular arrangement shown I have illustrated a loop collector A, whose inductance reactance is balanced by the capacities $C_1$, $C_1'$, the terminals $a$, $b$ of this electromotive element being connected to the baffle circuit comprising the baffle elements T, T' and the primary $p_1$ of the coupling transformer $p_1$, $s_1$. Across the points $a$, $b$, (which are made points of small potential difference for signal frequency and relatively large potential difference for strays, by virtue of the individual tuning of the electromotive element and the baffle element to the signal radio frequency,) is connected the reactive by-pass S and intensity selector I.S. The secondary coil $s_1$, which is shown as being tuned to the radio frequency by the condenser $C_r$, is connected to the input side of a radio frequency amplifier R.A., which feeds into the detector D through a transformer $p_2$, $s_2$. C.B. is a negative C-battery for maintaining the amplifier grid at the requisite small negative potential. The input side of the detector D is provided with an adjustable C-battery $P_c$, whereby the grid potential is adjusted to the point of most effective detection. When continuous waves are being received a local oscillator, or other source of radio frequency currents, O, is coupled to the input side of the detector D. I prefer to apply the local oscillations here, though they may be applied before amplification, if desired. When spark signals are being received the oscillator O may be omitted. I prefer to use a separate oscillator as shown, instead of a self-oscillating detector, as it makes possible an aperiodic coupling between the amplifier and the detector, or if a tuned coupling is desired it permits the precise tuning to the signal radio frequency instead of to the slightly different local oscillation frequency.

The output side of the detector feeds through a coupling transformer $p_3$, $s_3$ to an audio frequency amplifier A.A., whose output side is coupled to the audio frequency eliminating apparatus in a manner similar to that shown and described in connection with Fig. 2, and hence a detailed description thereof is not necessary in connection with this particular figure.

This arrangement is highly effective, since the great bulk of the stray energy is eliminated on the audio frequency side. By means of the amplifiers the signal energy together with the small residuum of stray energy is increased to the point where a highly effective separation by the audio frequency apparatus is secured; thus a very minute residuum of the original stray energy may be removed by apparatus including intensity selectors of moderate sensitivity.

This arrangement has the further advantage arising from the use of the reactive by-pass which converts the stray energy into shock oscillations of non-signal frequency, inasmuch as a relatively small frequency difference will suffice for the separation of the major part of the stray energy on radio frequency, while the residuum, in the form of shock oscillations of frequency slightly different from the signal frequency, is converted into heat oscillations having a relatively large difference from the signal beats of audio frequency, hence a very high degree of selectivity is secured in the audio frequency elimination.

It will be understood that if desired a simple intensity selector may be substituted for the intensity selector with a reactive by-pass on the radio frequency side, for the purpose of taking off the peaks of the stray impulses, though the complete arrangement shown in the drawing is more effective.

Fig. 4 shows an aperiodic receiving system including a collector A connected to the input terminals of the radio frequency amplifier R.A., which is coupled to the detector D in any suitable way. The form of coupling shown is a combined resistance and capacity coupling including the anode resistance $R_1$, the detector grid resistance $R_2$, and a coupling condenser $C_G$. When continuous waves are being received, the source of local oscillations O is preferably connected across the coupling condenser $C_G$ as shown. The detector D feeds through an audio frequency transformer $p_1$ $s_1$ into the audio frequency amplifier A.A., which in turn feeds into the stray eliminating system. The particular mode of coupling here shown is an impedance coil $L_a$ in the anode circuit, whose inductance is balanced by a capacity $C_s$ at the signal audio frequency. The terminals $a$, $b$ of this tuned electromotive element are connected to the baffle circuit and to the reactive by-pass and intensity selector, as already described.

With this form of coupling the reactance of $L_a$ is usually quite large, to work effectively with this rather large output impedance of the amplifier, hence the reactances of the baffle circuit should also be relatively large.

In this figure I have shown also an intensity selector I.S. employed as a shock absorber to take the peak off of violent strays before they are applied to the amplifiers and more sensitive selective apparatus. Usually a single intensity selector is sufficient for this purpose, since the tendency of violent strays is to produce an accumulation of negative potential on the grid, if the grid potential is low, though an opposed pair of intensity selectors may be employed if desired.

It will be readily understood that when a succession of amplifiers are used, I may also employ a succession of intensity selectors which progressively diminish the relative intensity of the progressively amplified strays. The form of intensity selector that I have shown for this purpose is a thermionic bulb containing an ionized gas, sensitized to a point near the critical point of inflection of its characteristic, as fully explained in my application of even date herewith.

Having now described my invention, what I claim as new therein and desire to secure by Letters Patent is as follows:

1. The method of eliminating the effect of strays in radio receiving, which consists in converting the high frequency impulses of signals and strays into impulses of lower frequency, separating the low frequency signal impulses and the stray impulses by selective admission of the signal impulses and concurrent preferential baffling and diversion of stray impulses, and receiving the undiverted signal impulses.

2. The method of eliminating the effect of strays in radio receiving, which consists in converting the impulses of high frequency into currents of lower frequency and separating the strays from the signal currents by intensity selection acting preferentially on non-signal pulses.

3. The method of separating radio signal impulses from strays which consists in reducing signal impulses and strays alike to lower frequency currents and separating the low frequency signal impulses from the strays by combined frequency and intensity selection, substantially as set forth.

4. The method of receiving high frequency signal impulses which consists in converting the signal impulses into impulses of lower or audio frequency, converting the shock oscillations produced by the strays into oscillations of low but different frequency from the signals, and separating the signal and stray oscillations by combined frequency and intensity selection, substantially as set forth.

5. The method of separating radio frequency signal impulses from strays which consists in converting the signal impulses of high frequency into impulses of lower frequency, converting the energy of strays into oscillations of a different lower frequency, receiving the converted impulses of signal frequency and preferentially diverting and dissipating the energy of the oscillations of non-signal frequency.

6. The method of separating radio frequency signal impulses from strays which consists in first removing the excessive stray impulses by intensity selection, converting the signal impulses together with the residuum of strays into impulses of lower frequency, selectively receiving the converted signal impulses and preferentially diverting and dissipating the converted stray impulses.

7. The method of separating radio signal impulses from strays which consists in first removing the peak of the stray impulses by intensity selection, converting the signal impulses together with the residuum of strays into impulses of low or audio frequency and separating the converted signal impulses from strays by combined frequency and intensity selection, substantially as set forth.

8. The method of separating radio signal impulses from strays which consists in removing excessive stray impulses at radio frequency, converting the radio frequency signal impulses and the residuum of strays into impulses of different lower frequencies, receiving the signals by selection of their converted frequency, and dissipating the residual strays by preferential action on their different converted frequency.

9. The method of separating radio signal impulses from strays, which consists in reducing the signal impulses and strays alike to currents of lower frequency, receiving the resulting signal impulses by virtue of their lower frequency periodicity and diverting and dissipating the energy of strays by preferential action on their abrupt pulses.

10. The method of separating radio signal impulses from strays, which consists in reducing the signal impulses and strays alike to currents of lower frequency, receiving the resulting signal impulses of low frequency and diverting and dissipating the energy of strays by preferentially acting intensity selection.

11. The method of receiving radio signal impulses which consists in reducing the signal impulses and strays alike to currents of lower frequency, receiving the resulting signal impulses of low or audio frequency and diverting and absorbing the energy of strays by intensity selection applied at points of small potential difference for signal impulses but relatively large potential difference for strays, substantially as set forth.

12. The method of receiving high frequency signal impulses which consists in combining these impulses with locally generated impulses of slightly different frequency, thereby producing beats of lower or audio frequency, and converting the energy of strays into shock oscillations of frequency slightly different from the signal frequency, whereby beats resulting from shock oscillations have a relatively large difference from the signal beats, separating the signal beats from the shock beats by selective admission of the signal beats and concurrent preferential diversion of the stray beats by virtue of their non-signal frequency, and receiving the energy of the signal beats, substantially as set forth.

13. The method of receiving high frequency signal impulses which consists in combining these impulses with locally generated impulses of slightly different frequency, thereby producing beats of lower or audio frequency, converting the energy of strays into shock oscillations of frequency slightly different from the signal frequency, whereby beats resulting from shock oscillations have a relatively large difference from the signal beats, and separating the signal impulses from the strays by combined frequency and intensity selection, substantially as set forth.

14. In a receiver of radiant energy, a collector whereby signal impulses and strays are received together, a detector, and means for separating the signal impulses from strays after passing through the detector, including means selectively admitting impulses of signal frequency and baffling and diverting stray impulses, and energy dissipating means cooperating to produce preferential dissipation of the diverted transitory impulses.

15. In a receiver of radiant energy a collector whereby signal impulses and strays are received together, means for converting the high frequency signal impulses and strays into impulses of different lower frequencies, means responsive to the converted signal frequency for selectively receiving the signal impulses and means for preferentially diverting and dissipating the converted impulses of non-signal frequency.

16. In a receiving system for radiant energy, a collector, a detector, a baffle element responsive to the audio frequency of sustained signal impulses for selectively receiving the signals and diverting transitory impulses, and energy absorbing means cooperating therewith to produce preferential dissipation of the diverted transitory impulses.

17. In a receiving system for radiant energy, a collector, a detector, a baffle element responsive to the signal audio frequency for selectively receiving the signals, and intensity selective means cooperating therewith for preferentially diverting strays from the receiver.

18. In a receiving system for radiant energy, a collector, a detector, means responsive to the signal audio frequency for selectively receiving the signals, and an intensity selective means for diverting strays from the receiver applied at points of small potential difference for signal impulses but relatively large potential difference for strays, substantially as set forth.

19. In a receiving system for radiant energy, means for converting the signal energy into periodic currents of lower frequency, a receiving circuit readily responsive to the converted signal frequency but highly reactive to other impulses, a stray circuit more readily responsive to shock impulses in which stray energy is converted into oscillations of non-signal frequency, and energy absorbing means cooperating with the receiving circuit to act preferentially on the non-signal oscillations.

20. In a receiving system for radiant energy, means for converting the signal energy into periodic currents of lower frequency, a receiving circuit readily responsive to the converted signal frequency but highly reactive to other impulses, a stray circuit more readily responsive to shock impulses in which stray energy is converted into oscillations of non-signal frequency, and energy absorbing means including an intensity selector for dissipating the energy of the non-signal oscillations.

21. In a receiving system for radiant energy, means for converting the radio frequency impulses into currents of lower frequency, a baffle circuit tuned to the converted signal frequency, a by-pass circuit associated therewith, stray dissipating means associated with these circuits at points of minimum potential difference for signal impulses and large potential difference for strays, and means for receiving the signal impulses.

22. In a receiving system for radiant energy, means for converting the radio frequency impulses into currents of lower frequency, a baffle circuit tuned to the converted signal frequency, a by-pass circuit associated therewith, intensity selective means associated with these circuits at points of minimum potential difference for signal impulses and large potential difference for strays, and means for receiving the signal impulses.

23. In a receiving system for radiant energy, means for converting the radio frequency impulses into currents of lower frequency, a signal receiving circuit readily responsive to the converted signal frequency but strongly reactive to strays, energy dissipating means associated therewith and strongly affected by the large stray reaction but practically unaffected by signals, and means for receiving the signal impulses.

24. In a receiving system for radiant energy, means for converting the radio frequency impulses into currents of lower frequency, a signal receiving circuit readily responsive to the converted signal frequency but strongly reactive to strays, intensity selective energy absorbing means associated therewith and strongly affected by the large stray reaction but practically unaffected by signals, and means for receiving the signal impulses.

25. In a receiving system for radiant energy, means for converting the radio frequency impulses into currents of lower frequency, means responsive to the converted signal frequency for receiving the sustained signal currents, and baffling erratic stray impulses, and means cooperating therewith into which the baffled stray impulses are preferentially diverted and by which their energy is dissipated.

26. In a receiving system for radiant energy, means for converting the radio frequency impulses into currents of lower frequency, means for receiving currents of converted signal frequency, and intensity selective means acting preferentially on non-signal pulses for diverting and dissipating the energy of strays.

27. In a receiving system for radiant energy, means for converting the radio frequency impulses into currents of lower frequency, means for receiving the converted periodic signal currents, intensity selective means for absorbing the shock energy of strays, and means for impressing the stray impulses strongly upon the energy absorbing means while not impressing signal impulses thereon.

28. In a receiving system for radiant energy, means for converting the radio frequency signal impulses into currents of lower frequency, means for converting stray impulses into shock oscillations of a different low frequency, energy absorbing means acting preferentially to divert and dissipate the shock oscillations of non-signal frequency, and means for observing the undiverted signal currents.

29. In a system for separating radio signal impulses from strays, means for converting the signal impulses and strays into currents of lower frequency, means for applying these currents to a complex oscillating system comprising a heavily loaded element responsive to the converted signal frequency currents but strongly reactive to the shock impulses of strays and a more mobile element in which stray impulses excite shock oscillations of non-signal frequency, means associated with the mobile element for diverting and dissipating the energy of shock oscillations therein, and means for receiving undiverted the signal energy in the heavily loaded element.

30. In a system for separating radio signal impulses from strays, means for converting the signal impulses and strays into currents of lower frequency, means for applying these currents to a complex oscillating system comprising a heavily loaded element responsive to the converted signal frequency currents but strongly reactive to the shock impulses of strays and a more mobile element in which stray impulses excite shock oscillations of non-signal frequency, means associated with the complex oscillating system for preferentially absorbing the shock reaction of the heavily loaded element, and means for receiving the unabsorbed signal energy.

31. In a system for separating radio signal impulses from strays, means for converting the signal impulses and strays into currents of lower frequency, means for applying these currents to a complex oscillating system comprising a heavily loaded element responsive to the converted signal frequency currents but strongly reactive to the shock impulses of strays and a more mobile element in which stray impulses excite shock oscillations of non-signal frequency, intensity selective means associated with the mobile element for diverting and dissipating the energy of shock oscillations therein and means for receiving undiverted the signal energy in the heavily loaded element.

32. In a system for separating radio signal impulses from strays, means for converting the signal impulses and strays into currents of lower frequency, means for applying these currents to a complex oscillating system comprising a heavily loaded element responsive to the converted signal frequency currents but strongly reactive to the shock impulses of strays and a more mobile element in which stray impulses excite shock oscillations of non-signal frequency, means associated with the mobile element for diverting and dissipating by preferential intensity selection the energy of shock oscillations therein, and means for receiving undiverted the signal energy in the heavily loaded element.

33. In a system for separating radio signal impulses from strays, means for converting the signal impulses and strays into currents of lower frequency, means for applying these currents to a complex oscillating system comprising a heavly loaded element responsve to the signal audio frequency currents but strongly reactive to the shock impulses of strays and a more mobile element in which stray impulses excite shock oscillations of non-signal frequency, means associated with the mobile element for diverting and dissipating by combined frequency and intensity selection the energy of shock oscillations therein, and means for receiving undiverted the signal energy in the heavily loaded element.

34. In a system of separating radio signal impulses from strays, means for converting the signal impulses and strays into currents of lower frequency, means for applying these currents to a complex oscillating system comprising a heavily loaded element responsive to the converted signal frequency currents but strongly reactive to the shock impulses of strays and a more mobile element in which stray impulses excite shock oscillations of non-signal frequency, means associated with the complex oscillating system for absorbing the shock reaction of the heavily loaded element and dissipating the energy of the shock oscillations in the mobile element, and means for receiving the unabsorbed signal energy in the heavily loaded element.

This specification signed and witnessed this second day of August, 1919.

FREDERICK K. VREELAND.

Witnesses:
FRANK L. AYERS,
C. D. JORDAN.